J. W. DE LAPPE.
FENDER FOR AUTOMOBILES.
APPLICATION FILED AUG. 22, 1913.
1,100,229.
Patented June 16, 1914.
2 SHEETS—SHEET 1.
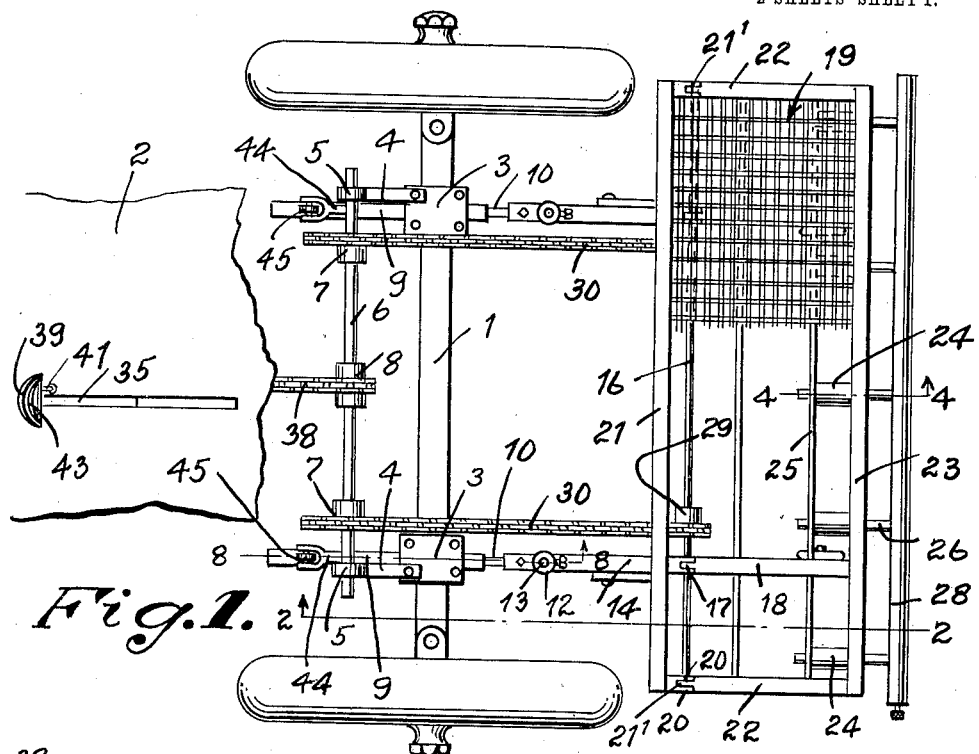
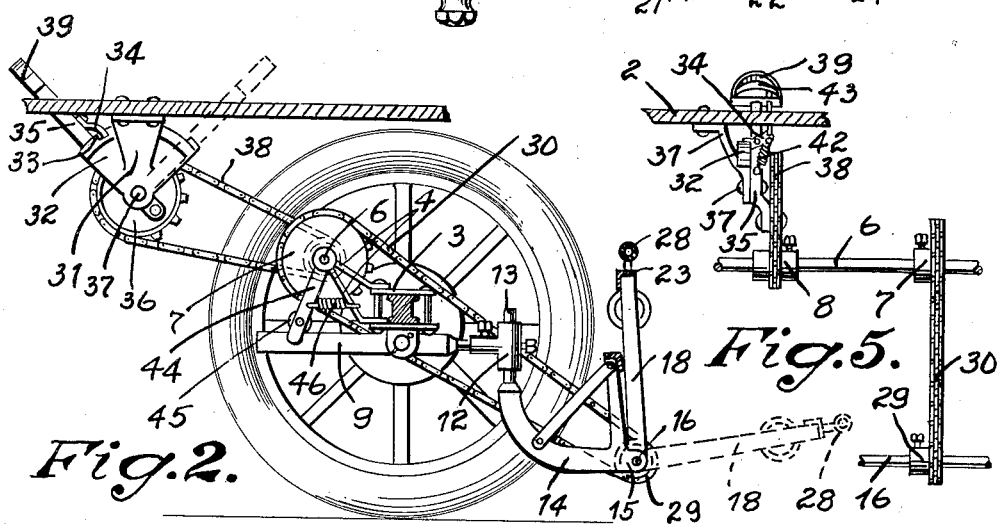
Witnesses
M. S. Watson
Inventor
J. W. DeLappe
By
Attorneys
COLUMBIA PLANOGRAPH CO., WASHINGTON, D. C.

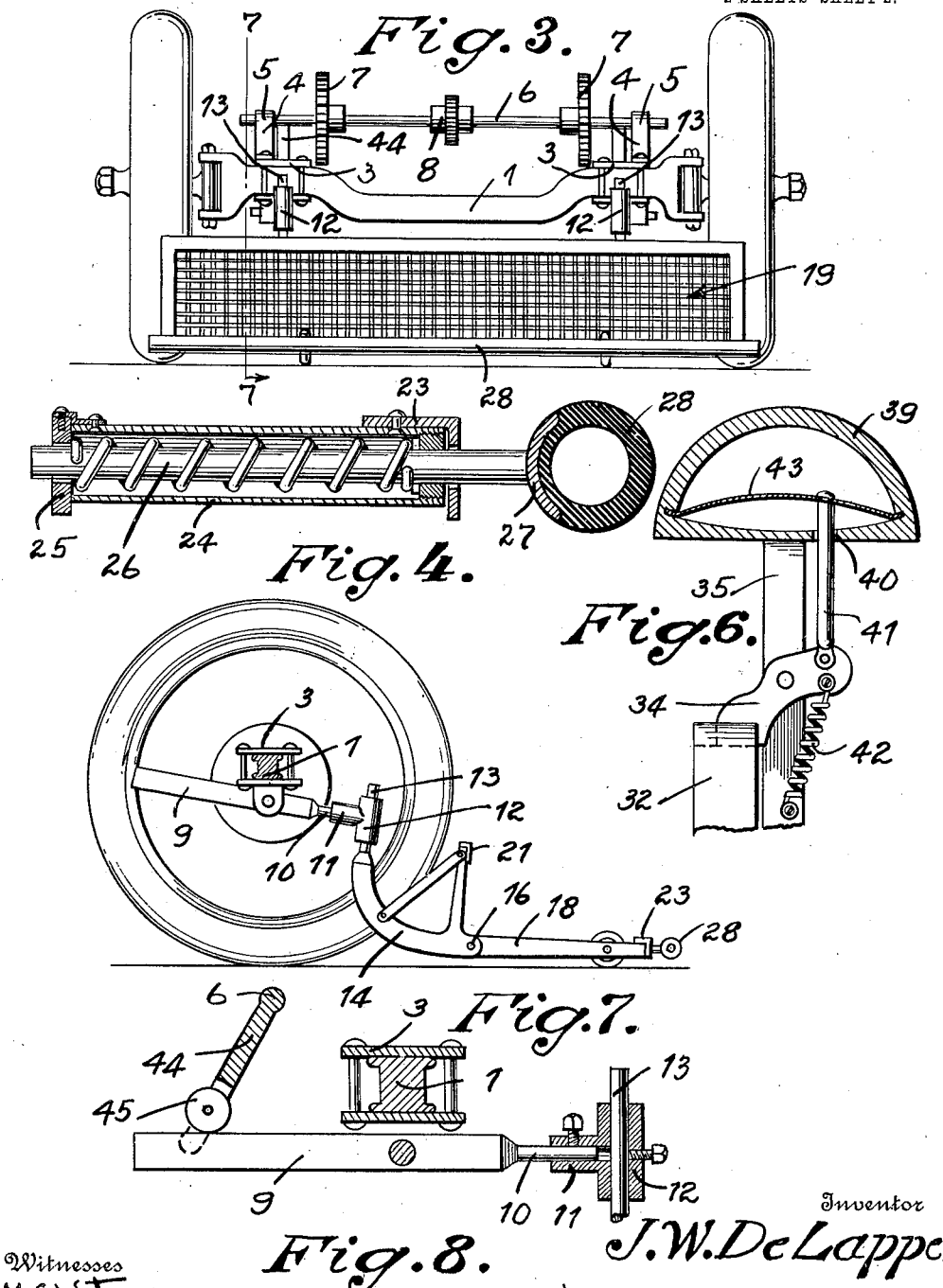

UNITED STATES PATENT OFFICE.

JOHN W. DE LAPPE, OF DORCHESTER, MASSACHUSETTS.

FENDER FOR AUTOMOBILES.

1,100,229.                  Specification of Letters Patent.     Patented June 16, 1914.

Application filed August 22, 1913. Serial No. 786,052.

*To all whom it may concern:*

Be it known that I, JOHN W. DE LAPPE, a citizen of the United States, residing at Dorchester, in the county of Suffolk, State of Massachusetts, have invented certain new and useful Improvements in Fenders for Automobiles; and I do hereby declare the following to be a full, clear, and exact description of the invention, such as will enable others skilled in the art to which it appertains to make and use the same.

The present invention is directed to improvements in fenders for automobiles, and has for its object to so construct a device of this character that the driver may control the operation of the same without leaving the seat.

A further object of the invention is to provide a fender for automobiles which may be instantly thrown into operative position when collision with a pedestrian is apparent.

With these and other objects in view, this invention resides in the novel features of construction, formation, combination and arrangement of parts to be hereinafter more fully described, claimed and illustrated in the accompanying drawing, in which:—

Figure 1 is a top plan view of the device showing the fender in its lowered position. Fig. 2 is a sectional view on line 2—2 of Fig. 1, the full lines showing the fender in its raised position, and the dotted lines showing the fender in its lowered position. Fig. 3 is a front view showing the fender lowered. Fig. 4 is a sectional view on line 4—4 of Fig. 1. Fig. 5 is a detail front elevation of the means for raising and lowering the fender. Fig. 6 is a detail view partly in section of the foot lever. Fig. 7 is a sectional view on line 7—7 of Fig. 3. Fig. 8 is a similar view on line 8—8 of Fig. 1.

Referring to the drawing, the numeral 1 designates the front axle of an automobile and 2 the floor thereof, both of which are of the usual construction. Secured in spaced relation upon the axle 1 are clamps 3, said clamps having supported thereby brackets 4, said brackets being provided with bearings 5 in which are journaled the opposite ends of the shaft 6, said shaft having keyed thereto sprocket wheels 7, and an intermediate sprocket wheel 8, the purpose of which will appear later.

Pivotally supported by the clamps 3 are arms 9, said arms having their forward ends provided with stems 10 which adjustably engage the horizontal bars 11 of the sleeves 12. Adjustably engaging the sleeves 12 are stems 13, the lower ends of which terminate in forwardly curved arms 14, the forward ends of which are formed with furcations 15 in which is journaled the shaft 16, the outer ends of said shaft being fixed to the tongues 17 carried by the bars 18 of the fender 19, said tongues being engaged between the furcations 15. The extreme outer ends of the shaft 16 are journaled in the furcations 20 formed upon the rear bar 21 of the fender 19. Engaged between the furcations 20 are the tongues 21' formed upon the inner ends of the side bars 22 of the fender, said bars having their outer ends, and likewise the bars 18, secured to the front bar 23 of the fender. The fender 19 is provided with cylinders 24, which are supported by the front bar 23 and intermediate brace bar 25. Slidably mounted in the cylinders 24 are spring pressed shafts 26, the outer ends of which are formed with heads 27 which support the rubber buffer 28 which extends transversely of the fender 19.

Fixed to the shaft 16 are sprocket wheels 29, and trained around said sprocket wheels and the sprocket wheels 7 are sprocket chains 30, the purpose of which will appear later.

Secured to the floor 1 is a hanger 31 having formed integral therewith a segment 32, said segment being provided with a notch 33 which is engageable by the pawl 34, said pawl being pivotally connected to the foot lever 35. The foot lever 35 has its lower end fixed to one side of the sprocket wheel 36 which is mounted upon the stub shaft 37, said stub shaft being supported by the lower end of the segment 32. A sprocket chain 38 is trained around the sprocket wheel 36 and intermediate sprocket wheel 8, carried by the shaft 6. The upper end of the foot lever 35 is provided with a stirrup 39, the tread of which is provided with perforations 40 in which is engaged a link 41, the lower end of which is pivotally connected to the pawl 34 which is normally held in engagement with the notch 33 by the compression spring 42 which connects the pawl and foot lever. A bow spring 43 is carried by the stirrup 39 and has connected thereto the upper end of the link 41, said link being operable to actuate the pawl 34 to disengage the notch 33 when the driver's foot is placed in the stirrup and the bow spring 43 flexed.

Formed integral with the shaft 6 and adjacent the opposite ends thereof are arms 44, the lower ends of which carry anti-friction wheels 45 which engage the rear ends of the arms 9. The arms 44 are normally disposed in acute angular relation with the arms 9 and are connected to the brackets 4 by coil springs 46, which are of sufficient tension to hold the fender in the position shown in Fig. 2.

The operation of the device is as follows:—Should the driver be unable to avoid striking a person he engages his foot in the stirrup 39 which action disengages the pawl 34 from the notch 33, whereupon forward movement of the lever 35 will cause the sprocket 36 to rotate, thus operating the sprocket chain 38 which through the medium of the sprocket wheel 8 rotates the shaft 6, and as the sprocket wheels 7 are fixed thereto movement is transmitted to the chains 30 which in turn rotates the shaft 16 through the medium of the sprocket wheels 29. The rotation of the shaft 16 in one direction will operate the fender 19 so that the same will assume the position shown in dotted lines in Fig. 2. Should an object fall upon the fender when in this position, the same will assume a position as shown in Fig. 7 during which time the arms 9 will rock upon their pivots, thus shifting the arms 44 rearwardly. After the weight of the object is removed from the fender the springs 46 will turn the fender to the position shown in dotted lines in Fig. 2. It is obvious that when it is desired to reset the fender, or return the same to the position shown in Fig. 2, it is only necessary to shift the foot lever 35 from the dotted to the full line position shown in the same figure.

What is claimed is:—

1. In combination with the front axle of an automobile, of a shaft supported thereby, sprocket wheels fixed to the shaft, clamps carried by the axle, arms pivotally supported by the clamps, a fender supported by the arms, a shaft carried by the fender, sprocket wheels fixed to the shaft, sprocket chains connecting the first and second named sprocket wheels, a foot lever carried by the automobile, a sprocket wheel fixed to the foot lever, a sprocket chain connecting the last named sprocket wheel and one of the first named sprocket wheels, and arms carried by the first named shaft for yieldably engaging the first named arms whereby, when said lever is shifted, the shafts are rotated to operate the fender, said second named arms serving to return the fender to a horizontal position.

2. In combination with the front axle of an automobile, of arms pivotally supported thereby, a fender supported by the arms, a shaft carried by the fender, sprocket wheels fixed to the shaft, a shaft supported by the axle, sprocket wheels fixed to the last named shaft, sprocket chains trained around the sprocket wheels of both shafts, a segment carried by the automobile, a foot lever connected to the segment, a sprocket wheel connected to the lever and connected to one of the sprocket wheels carried by the axle-supported shaft, a stirrup carried by the upper end of the foot lever, a spring pressed pawl carried by the foot lever for engaging the segment to hold the fender in its raised or vertical position, means carried by the stirrup for disengaging the pawl from the segment whereby the foot lever may be swung forwardly, thereby rotating the first and second named shafts to swing the fender to its raised or vertical position, and means engaging said arms for holding the same normally horizontal.

In testimony whereof, I affix my signature, in the presence of two witnesses.

JOHN W. DE LAPPE.

Witnesses:
GEORGE A. HOLST,
JOHN J. DUNKERLEY.